J. GALADAKES.
DRAWING DEVICE.
APPLICATION FILED FEB. 12, 1918.
1,272,792.
Patented July 16, 1918.
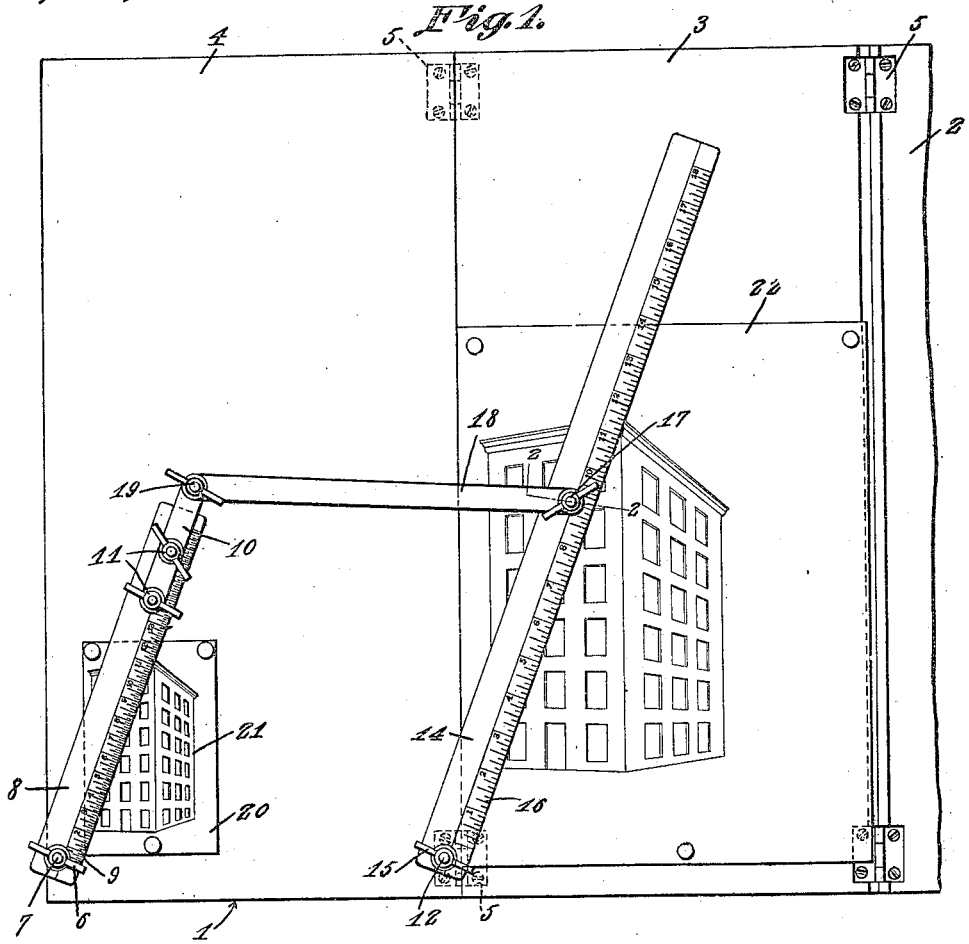
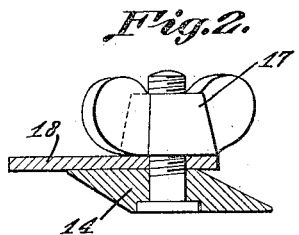

UNITED STATES PATENT OFFICE.

JOHN GALADAKES, OF LEWISTON, MAINE.

DRAWING DEVICE.

1,272,792.

Specification of Letters Patent.

Patented July 16, 1918.

Application filed February 12, 1918. Serial No. 216,693.

*To all whom it may concern:*

Be it known that I, JOHN GALADAKES, a citizen of the United States, residing at Lewiston, in the county of Androscoggin and State of Maine, have invented a new and useful Drawing Device, of which the following is a specification.

The device forming the subject matter of this application is adapted to be used for reproducing designs on a scale differing from the scale of the original, and the invention aims to provide a simple structure of the sort above mentioned, whereby the azimuth of a point may be determined, and whereby the lineal distance of such a point, with respect to a point of reference, may be fixed.

It is within the province of the disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a plan wherein parts are broken away; and Fig. 2 is a section on the line 2—2 of Fig. 1.

In carrying out the present invention, there is provided a table 1, which may be of any desired form. In order that the table 1 may be folded up to occupy but little space, the table may embody leaves 2, 3 and 4, united by hinges 5.

The leaf 4 is provided with a stud 7 on which an arm 8 is mounted to swing, parallel to the table, the arm having a scale 9. A wing nut 6 is mounted on the stud 7 and holds the arm 8 thereon for swinging movement. A bracket 10 is superposed on the arm 8 at the free end thereof and is held in place by securing elements 11 which may be bolt-and-wing-nut structures.

The leaf 4 carries a stud 12 on which an arm 14 is mounted to swing in a direction parallel to the table, there being a wing nut 15 on the stud 12, which holds the arm 14 in place for swinging movement, as aforesaid.

The arm 14 preferably is longer than the arm 8 and is disposed parallel thereto, the arm 14 having a scale 16. The units of the scales 9 and 16 on the respective arms are of different lengths, the units of the scale 16 on the arm 14 in the present instance being longer than the units of the scale 9 on the arm 8, it being presupposed that the design is to be enlarged, as explained hereinafter. A plurality of the arms 14 may be provided, the various arms having different scales, and one arm being adapted to be substituted for another, depending upon the extent to which the design is to be enlarged or reduced.

The arm 14 carries a pivot element 17, which may be a bolt and wing nut, and upon this pivot element is mounted one end of a rigid link 18, the other end of which is united by means of a pivot element 19 with the bracket 10 on the arm 8. Owing to the provision of the bracket 10, the pivot joint at 19 may be metal upon metal, the link 18 and the bracket 10 being made of metal, whereas the arm 8 ordinarily is of wood. The bracket 10 and the securing elements 11 afford a convenient means whereby one arm 8 may be substituted for another having different graduations.

The numeral 20 denotes a sheet attached temporarily to the leaf 4 and carrying a design 21. A sheet 22 is attached removably to the leaf 3.

In practical operation, when a point on the design 21 is selected, then the arm 8 is swung until the fiducial edge of the arm coincides with the point selected. The distance to the selected point on the design 21 is read off along the scale 9 on the arm 8, from the zero of said scale. When the arm 8 is swung laterally, motion is transmitted to the arm 14 by means of the link 18. Then the appropriate graduation on the scale 16 of the arm 14 is noted, and a mark is made on the sheet 22 opposite to this graduation. By the procedure above outlined, any desired number of points may be located on the sheet 22, these points bearing the same relation to each other as do the corresponding points on the sheet 20.

The points fixed on the sheet 22 may be connected by lines, whereupon the design will be reproduced on a scale differing from the scale of the original design 21 on the sheet 20.

Having thus described the invention, what is claimed is:

A device for reproducing designs on a scale differing from the scale of the original, comprising a table; parallel arms mounted to move over the surface of the table and having scales, the units of the scales on the respective arms being of different lengths; means for pivoting corresponding parts of the arms of the table; a link; and means for pivotally connecting the link with the arms in spaced relation to said pivoting means.

In testimony that I claim the foregoing as my own, I have hereto affixed my signature in the presence of two witnesses.

JOHN GALADAKES.

Witnesses:
BENJAMIN L. BERMAN,
CONSTANTINE PAJSYADAKIJ.

Copies of this patent may be obtained for five cents each, by addressing the "Commissioner of Patents, Washington, D. C."